(12) United States Patent
Shibata

(10) Patent No.: US 10,863,078 B2
(45) Date of Patent: Dec. 8, 2020

(54) FOCUS DETECTION APPARATUS AND METHOD

(71) Applicant: CANON KABUSHIKI KAISHA, Tokyo (JP)

(72) Inventor: Nobuhiro Shibata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 16/192,903

(22) Filed: Nov. 16, 2018

(65) Prior Publication Data

US 2019/0158760 A1 May 23, 2019

(30) Foreign Application Priority Data

Nov. 22, 2017 (JP) .................................. 2017-224852

(51) Int. Cl.
*H04N 5/232* (2006.01)
*H04N 5/235* (2006.01)

(52) U.S. Cl.
CPC ..... *H04N 5/232123* (2018.08); *H04N 5/2353* (2013.01); *H04N 5/232122* (2018.08); *H04N 5/232127* (2018.08)

(58) Field of Classification Search
CPC ....... H04N 5/232123; H04N 5/232122; H04N 5/232127; H04N 5/2353
See application file for complete search history.

(56) References Cited

U.S. PATENT DOCUMENTS

| | | | | |
|---|---|---|---|---|
| 2005/0168621 A1* | 8/2005 | Kageyama | ......... | H04N 5/23212 348/349 |
| 2006/0165403 A1* | 7/2006 | Ito | .......... | G02B 7/285 396/123 |
| 2010/0150538 A1* | 6/2010 | Ono | ........ | G03B 13/00 396/104 |
| 2011/0194018 A1* | 8/2011 | Kosaka | .................. | G03B 13/36 348/349 |
| 2011/0228053 A1* | 9/2011 | Aoki | ................. | H04N 5/23212 348/49 |
| 2012/0069233 A1* | 3/2012 | Nonaka | .............. | H04N 1/00244 348/333.02 |
| 2015/0054965 A1* | 2/2015 | Sudo | .................... | H04N 5/2354 348/169 |
| 2015/0181096 A1* | 6/2015 | Kasai | ................. | H04N 5/23212 348/362 |

FOREIGN PATENT DOCUMENTS

JP 2013-003501 A 1/2013

\* cited by examiner

*Primary Examiner* — Abdelaaziz Tissire
(74) *Attorney, Agent, or Firm* — Cowan, Liebowitz & Latman, P.C.

(57) ABSTRACT

A focus detection apparatus comprising: a setting unit that selects and sets one of a plurality of predetermined focus detection areas which include a first focus detection area and a second focus detection area located in a periphery of a screen in an image shooting mode for shooting the moon; a first calculation unit that calculates an in-focus position in the first focus detection area based on a phase difference between a pair of focus detection signals having a parallax output from an image sensor; and a second calculation unit that calculates an in-focus position in the second focus detection area based on contrast of image signals output from the image sensor.

12 Claims, 14 Drawing Sheets

FIG. 10A
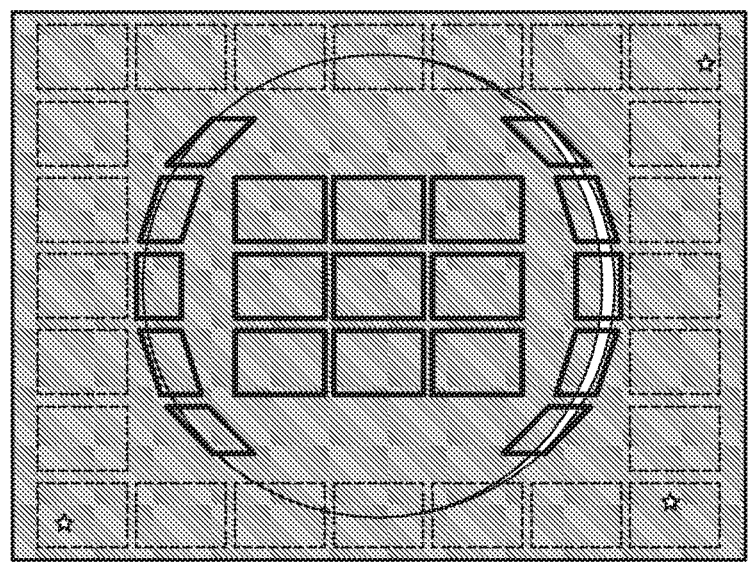
FIG. 10B
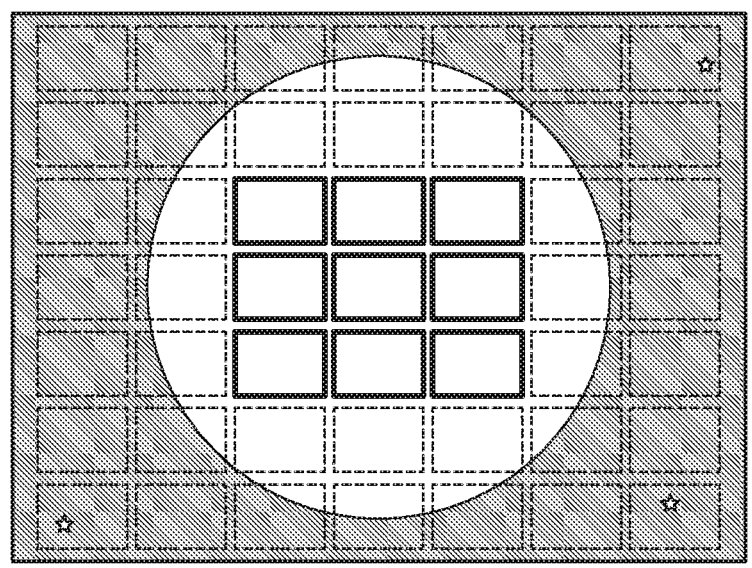
FIG. 10C
| AREA 4 | AREA 4 | AREA 4 | AREA 4 | AREA 4 | AREA 4 | AREA 4 |
|---|---|---|---|---|---|---|
| AREA 4 | AREA 3 | AREA 3 | AREA 3 | AREA 3 | AREA 3 | AREA 4 |
| AREA 4 | AREA 3 | AREA 2 | AREA 2 | AREA 2 | AREA 3 | AREA 4 |
| AREA 4 | AREA 3 | AREA 2 | AREA 1 | AREA 2 | AREA 3 | AREA 4 |
| AREA 4 | AREA 3 | AREA 2 | AREA 2 | AREA 2 | AREA 3 | AREA 4 |
| AREA 4 | AREA 3 | AREA 3 | AREA 3 | AREA 3 | AREA 3 | AREA 4 |
| AREA 4 | AREA 4 | AREA 4 | AREA 4 | AREA 4 | AREA 4 | AREA 4 |

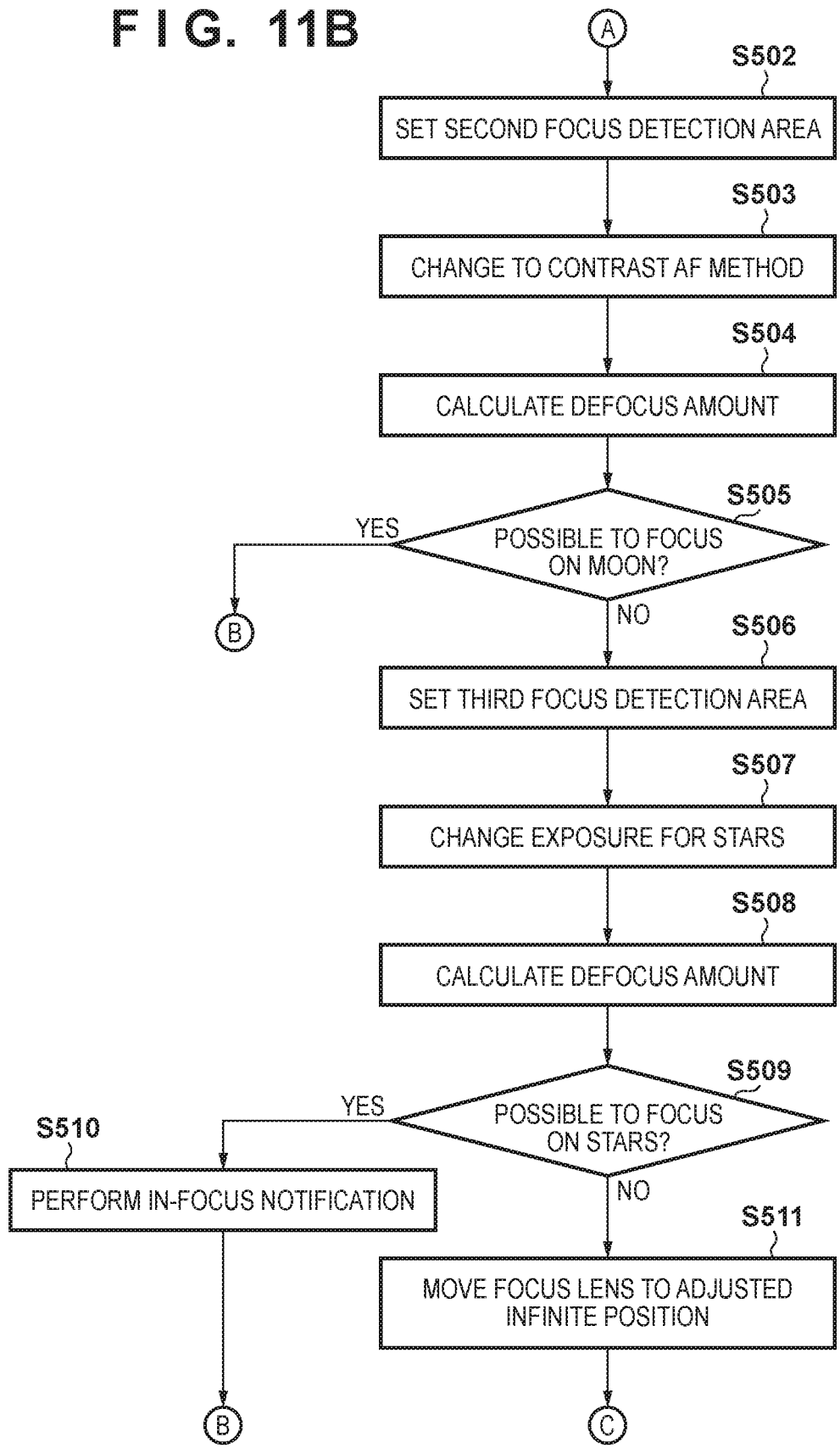

FOCUS DETECTION APPARATUS AND METHOD

BACKGROUND OF THE INVENTION

Field of the Invention

The present invention relates to a focus detection apparatus and method, and more particularly to a technique for focusing on a celestial body.

Description of the Related Art

In recent years, the number of pixels in image capturing apparatuses such as cameras and videos has increased, a slight defocus state of an image has become conspicuous and, more precise focusing is desired. This is the same in shooting an image of celestial bodies (stars, moon, and so forth) in the night sky.

Focusing on celestial bodies is performed by calculating a focus position at which an area represented by high brightness signals is strictly minimized when regarding each celestial body as a point light source. As stars and the moon which are subjects in astrophotography at night are located substantially at infinity and there are specific exposure settings for astrophotography, there is an independent shooting mode for astrophotography different from other scene modes. Hereinafter, a mode for shooting the moon as the main subject is referred to as a "moon shooting mode".

Normally, the focus position at which an object located substantially at infinity is in focus is uniquely determined by performing infinite focus adjustment in individual image capturing apparatus. However, due to a difference between temperature at a time of the infinite focus adjustment and temperature of the image capturing apparatus at a time of actually shooting a celestial body, a difference in posture, and so forth, the focus may shift during shooting. For this reason, it is necessary to often adjust focus even during shooting a celestial body whose distance from the image capturing apparatus does not substantially change during shooting.

Conventionally, there are contrast AF and phase difference AF as representative auto focus adjustment methods. In the contrast AF, the automatic focus adjustment is performed using contrast evaluation values obtained by performing a filtering process on luminance signals obtained from an image sensor and extracting a specific frequency component. On the other hand, in the phase difference AF, the automatic focus adjustment is performed by forming images with light beams from a subject passing through mutually different exit pupil regions of the imaging optical system on a pair of line sensors, and calculating a defocus amount of the imaging optical system from a phase difference between the image signals obtained from the pair of line sensors. Generally, the phase difference AF has an advantage that the time to be taken for performing the automatic focus adjustment is shorter than the contrast AF.

Here, in the moon shooting mode, for example, when a zoom lens is driven with the moon located at the center of the screen and focus adjustment on the moon is performed, there is a case in which it is impossible to focus on the moon depending on a situation. The situation includes, for example, when the shape of the moon is close to the new moon (FIG. 13A), when the cloud is hanging on the moon (FIG. 13B), and so forth.

Japanese Patent Laid-Open No. 2013-3501 discloses that in a case where the subject moves out of the center of the screen and moves to the periphery of the screen when performing the phase difference AF, the contrast AF is more suitable than the phase difference AF in terms of detection accuracy, and therefore, proposes a method of switching between these AF methods according to the moved position of the subject.

However, the technique described in Japanese Patent Laid-Open No. 2013-3501 is a method in which the subject near the center of the screen is focused by the phase difference AF, and when the subject moves out of the center of the screen toward the periphery of the screen, the phase difference AF is switched to the contrast AF. Therefore, in a case where the moon is not detected in the center of the screen in the moon shooting mode, it is not possible to find the in-focus position using this method.

SUMMARY OF THE INVENTION

The present invention has been made in consideration of the above situation, and in the mode of shooting a predetermined main subject, focus adjustment is performed with high accuracy on the main subject that cannot be focused in the phase difference AF, by using subjects existing in the vicinity of the main subject.

According to the present invention, provided is a focus detection apparatus comprising one or more processors and/or circuitry which functions as: a setting unit that selects and sets one of a plurality of predetermined focus detection areas which include a first focus detection area and a second focus detection area located in a periphery of a screen in an image shooting mode for shooting a predetermined main subject; a first calculation unit that calculates an in-focus position in the focus detection area set by the setting unit based on a phase difference between a pair of focus detection signals having a parallax obtained by performing photoelectric conversion on light entering through an imaging optical system by an image sensor having a plurality of pixels that include focus detection pixels which output the pair of focus detection signals; and a second calculation unit that calculates an in-focus position in the focus detection area set by the setting unit based on contrast of image signals output from the image sensor, wherein, in a case where the first focus detection area is set by the setting unit, the in-focus position is calculated by the first calculation unit, and in a case where the second focus detection area is set by the setting unit, the in-focus position is calculated by the second calculation unit.

Further, according to the present invention, provided is a focus detection method comprising: selecting and setting one of a plurality of predetermined focus detection areas which include a first focus detection area and a second focus detection area located in a periphery of a screen in an image shooting mode for shooting a predetermined main subject; calculating, in a case where the first focus detection area is set, an in-focus position in the first focus detection area based on a phase difference between a pair of focus detection signals having a parallax obtained by performing photoelectric conversion on light entering through an imaging optical system by an image sensor having a plurality of pixels that include focus detection pixels which output the pair of focus detection signals, and calculating, in a case where the second focus detection area is set, an in-focus position in the second focus detection area based on contrast of image signals output from the image sensor.

Furthermore, according to the present invention, provided is a non-transitory storage medium readable by a computer, the storage medium storing a program that is executable by the computer, wherein the program includes program code for causing the computer to function as a focus detection apparatus comprising: a setting unit that selects and sets one of a plurality of predetermined focus detection areas which include a first focus detection area and a second focus detection area located in a periphery of a screen in an image shooting mode for shooting a predetermined main subject; a first calculation unit that calculates an in-focus position in the focus detection area set by the setting unit based on a phase difference between a pair of focus detection signals having a parallax obtained by performing photoelectric conversion on light entering through an imaging optical system by an image sensor having a plurality of pixels that include focus detection pixels which output the pair of focus detection signals; and a second calculation unit that calculates an in-focus position in the focus detection area set by the setting unit based on contrast of image signals output from the image sensor, wherein, in a case where the first focus detection area is set by the setting unit, the in-focus position is calculated by the first calculation unit, and in a case where the second focus detection area is set by the setting unit, the in-focus position is calculated by the second calculation unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 10A to 10C are views for explaining an example of setting of focus detection areas according to the first embodiment;

FIGS. 11A and 11B show a flowchart of focus adjustment processing in the moon shooting mode according to a second embodiment;

DESCRIPTION OF THE EMBODIMENTS

Exemplary embodiments of the present invention will be described in detail in accordance with the accompanying drawings.

First Embodiment

Figure 1:
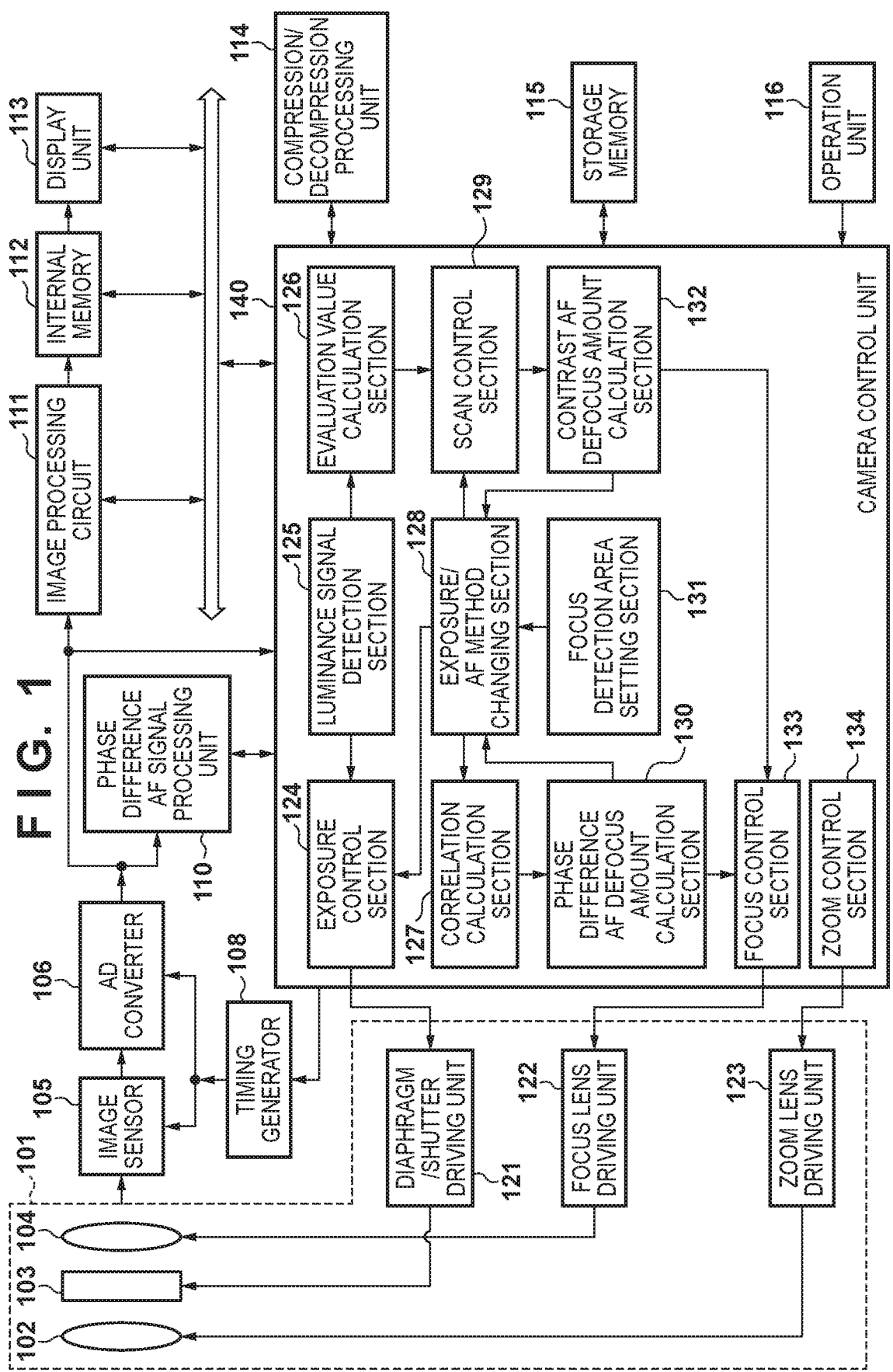
FIG. 1 is a block diagram showing a schematic configuration of a digital camera according to an embodiment of the present invention.

FIG. 1 is a block diagram showing a schematic configuration of a digital camera as an example of an image capturing apparatus according to a first embodiment of the present invention.

A lens unit 101 (imaging optical system) holds a lens group including a plurality of lenses such as a zoom lens 102 and a focus lens 104, and a diaphragm/shutter 103 therein, and drives them. The lens unit 101 may be an interchangeable lens unit or a camera-integrated lens unit. The zoom lens 102 optically changes an angle of view by adjusting the focal length. The diaphragm/shutter 103 is used for exposure control for adjusting an amount of light. The focus lens 104 adjusts a focus position.

Light entering through the lens unit 101 is received by an image sensor 105 which uses a CCD (Charge Coupled Device), CMOS (Complementary Metal Oxide Semiconductor), or the like, and converted into electric signals corresponding to the amount of received light by photoelectric conversion.

Figure 2A:
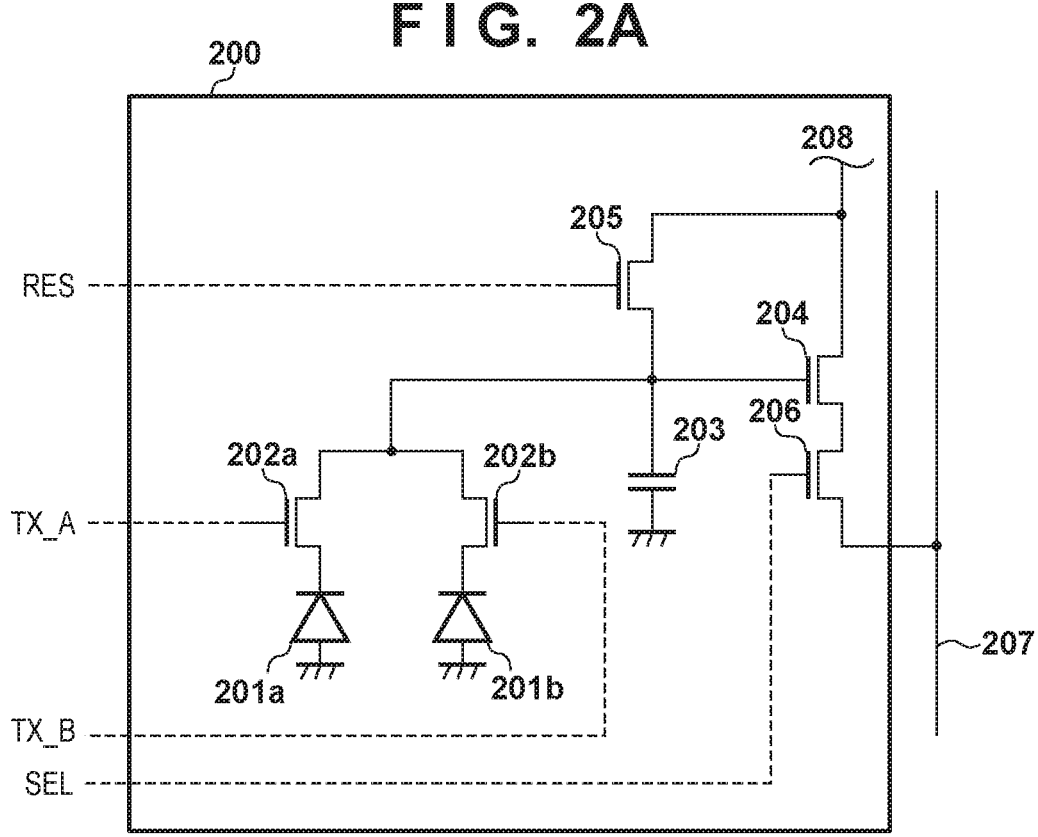
FIG. 2A is a circuit diagram of a pixel of an image sensor according to the embodiment.

The configuration of the image sensor 105 will now be described with reference to FIGS. 2A and 2B. FIG. 2A is a circuit diagram showing the configuration of a pixel 200 in the image sensor 105. The pixel 200 includes photodiodes (PD) 201a and 201b, transfer switches 202a and 202b, a floating diffusion (FD) region 203, an amplifier 204, a reset switch 205, and a selection switch 206. Each switch may be constituted by a MOS transistor or the like. Each switch is assumed to be an N-type MOS transistor as an example, but each switch may be a P-type MOS transistor or another switching element.

As described above, in the image sensor 105 in this embodiment, one pixel 200 has two PDs 201a and 201b. However, the number of photodiodes provided in each pixel 200 is not limited to two, and three or more (for example, four) photodiodes may be provided. In this embodiment, as will be described later, the PDs 201a and 201b function as focus detection pixels and also as imaging pixels.

Figure 2B:
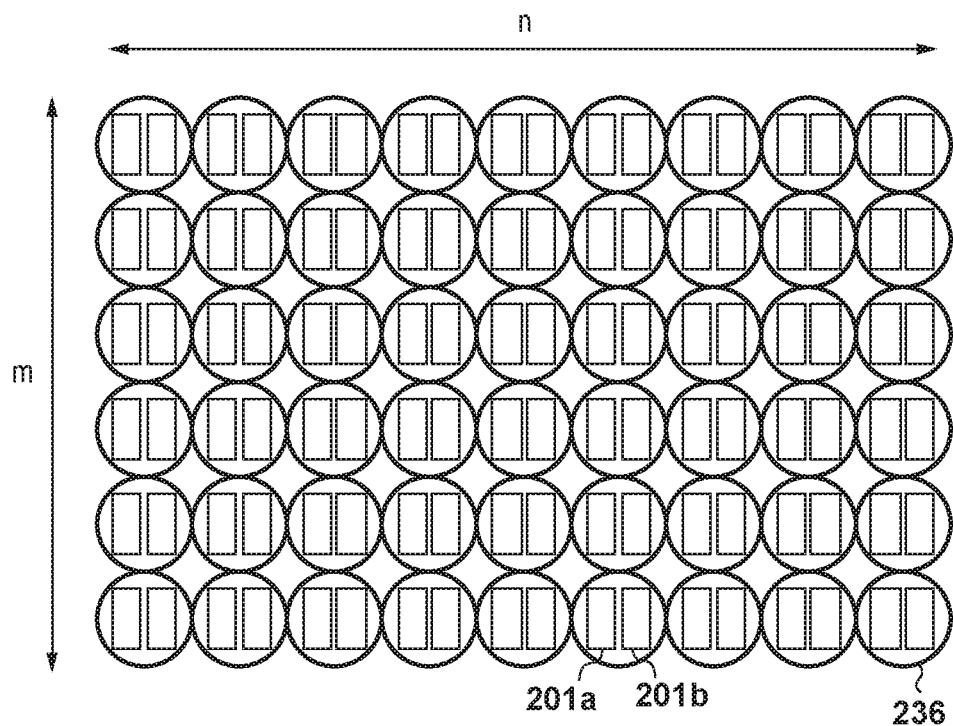
FIG. 2B is a schematic diagram showing an arrangement of pixels of the image sensor.

The PDs 201a and 201b function as photoelectric converters that receive light having passed through the same microlens 236 shown in FIG. 2B and generate signal charges according to the amount of received light by photoelectric conversion. A signal obtained by the PD 201a is referred to as an A signal, and a signal obtained by the PD 201b is referred to as a B signal, hereinafter.

The transfer switch 202a is connected between the PD 201a and the FD region 203, and the transfer switch 202b is connected between the PD 201b and the FD region 203. The transfer switches 202a and 202b are elements for transferring charges generated in the PDs 201a and 201b, respectively, to the common FD region 203, and are controlled by control signals TX_A and TX_B, respectively.

The FD region 203 temporarily holds the charges transferred from the PDs 201a and 201b and also functions as a charge-voltage conversion unit that converts the held charge into a voltage signal.

The amplifier 204 is a source follower MOS transistor. The gate of the amplifier 204 is connected to the FD region 203, and the drain of the amplifier 204 is connected to a common power supply 208 which supplies the power supply potential VDD. The amplifier 204 amplifies the voltage signal based on the electric charge held in the FD region 203 and outputs it as an image signal.

The reset switch 205 is connected between the FD region 203 and the common power supply 208. The reset switch 205 is controlled by a control signal RES and has a function of resetting the potential of the FD region 203 to the power supply potential VDD.

The selection switch 206 is connected between the source of the amplifier 204 and a vertical output line 207. The selection switch 206 is controlled by a control signal SEL and outputs the image signal amplified by the amplifier 204 to the vertical output line 207.

FIG. 2B is a schematic diagram showing an arrangement of a part of the pixels of the image sensor 105, and shows a state in which pixels each having the configuration shown in FIG. 2A are arranged with n pixels in the horizontal direction and m pixels in the vertical direction. Then, as shown in FIG. 2B, the PDs 201$a$ and 201$b$ of each pixel correspond to one microlens 236.

In the present embodiment, it is assumed that the A signal and an (A+B) signal obtained by adding the A signal and the B signal in the image sensor 105 are read out from each pixel having the configuration shown in FIGS. 2A and 2B. Note that the A signal and the B signal may be read separately.

Note that the arrangement of the image sensor 105 and the number of pixels are not limited thereto, and at least some of the pixels constituting the image sensor 105 may be pixels having the configuration shown in FIG. 2A. Alternatively, a plurality of pairs of pixels (focus detection pixels) whose partial regions (for example, a half thereof), different between each pair of pixels, of the photoelectric conversion portions of the pixels are shielded from light may be discretely arranged and the obtained pair of signals may be used as focus detection signals. In this case, since the focus detection pixels are defective as pixels for obtaining an image signal, it is necessary to interpolate the signal corresponding to the focus detection pixels. Since the interpolation processing is a well-known technique, detailed explanation is omitted.

An AD converter 106 performs noise reduction processing, gain adjustment, and digitization on the A signal and (A+B) signal read out from the image sensor 105, and outputs the processed electric signal. A timing generator 108 controls the conversion timing to the electric signal in the image sensor 105 and the output timing of the AD converter 106 according to an instruction from a camera control unit 140.

The (A+B) signal output from the AD converter 106 can be used as it is as an image signal, and is input to an image processing circuit 111 and to a luminance signal detection section 125 in the camera control unit 140. When the A signal and B signal are separately read out, for example, the A signal and B signal are added in the image processing circuit 111 to generate an image signal, and the generated image signal is supplied to the luminance signal detection section 125. The image processing circuit 111 performs pixel interpolation processing, color conversion processing, and the like on the image signal, and then sends it to an internal memory 112 as image data. A display unit 113 displays image information and the like together with the image data held in the internal memory 112. A compression/decompression processing unit 114 compresses and decompresses the image data stored in the internal memory 112 according to the image format. The compressed image data is stored in a storage medium (not shown).

On the other hand, the A signal and (A+B) signal are input to a phase difference AF signal processing unit 110. In the phase difference AF signal processing unit 110, the B signal is obtained by subtracting the A signal from the (A+B) signal, thereby obtaining a pair of focus detection signals (A signal and B signal) to be used in on-imaging surface phase difference AF. The pair of focus detection signals generated by the phase difference AF signal processing unit 110 is output to a correlation calculation section 127 in the camera control unit 140, and the correlation calculation section 127 calculates an image shift amount. The details of the process of calculating the image shift amount will be described later. In a case where the A signal and B signal are separately read out, they may be output directly to the correlation calculation section 127 without passing through the phase difference AF signal processing unit 110.

A storage memory 115 stores various data such as parameters. An operation unit 116 is a user interface that performs various menu operations and mode switching operations. The camera control unit 140 is composed of an arithmetic unit such as a CPU (Central Processing Unit) and executes various control programs stored in the internal memory 112 in response to a user operation by the operation unit 116. The control program includes, for example, a program for performing automatic exposure control, zoom control, automatic focus control, and the like.

The luminance signal detection section 125 detects the luminance of the subject and the scene based on the image signal output from the AD converter 106. An exposure control section 124 calculates the exposure value (aperture value and shutter speed) based on the luminance information obtained by the luminance signal detection section 125, and notifies a diaphragm/shutter driving unit 121 of the result of the calculation, and the diaphragm/shutter driving unit 121 drives the diaphragm/shutter 103. The exposure control section 124 also controls to amplify the image signal output from the AD converter 106 at the same time. As a result, automatic exposure control (AE control) is performed.

A zoom control section 134 controls the zoom lens position according to a zoom operation instruction from the operation unit 116, and a zoom lens driving unit 123 drives the zoom lens 102 based on the zoom lens position from the zoom control section 134.

A phase difference AF defocus amount calculation section 130 calculates a defocus amount by the phase difference AF method based on the image shift amount calculated by the correlation calculation section 127. A focus control section 133 controls the driving direction and the driving amount of the focus lens 104 based on the calculated defocus amount. A focus lens driving unit 122 drives the focus lens 104 based on the driving direction and the driving amount from the focus control section 133.

An evaluation value calculation section 126 extracts a specific frequency component from the luminance information obtained by the luminance signal detection section 125 and then calculates a contrast evaluation value from the extracted specific frequency component. A scan control section 129 instructs the focus control section 133 to drive the focus lens 104 with a predetermined driving amount in a predetermined range, and at the same time the scan control section 129 obtains the contrast evaluation values which are the calculation results of the evaluation value calculation section 126 at a plurality of focus lens positions. Then, the shape of the contrast evaluation values is obtained.

A contrast AF defocus amount calculation section 132 calculates a defocus amount using the contrast AF method based on the focus position at which the contrast evaluation value obtained by the scan control section 129 is maximized. Then, the focus lens 104 is driven based on the defocus amount calculated by the phase difference AF defocus amount calculation section 130 or the defocus amount calculated by the contrast AF defocus amount calculation section 132. As a result, automatic focus control (AF control) in which the light beam converges on the surface of the image sensor 105 is performed.

A focus detection area setting section 131 sets the number, position, and size of the areas (hereinafter referred to as "focus detection areas") for calculating the defocus amount. In accordance with the result obtained from the phase difference AF defocus amount calculation section 130 and the contrast AF defocus amount calculation section 132 for the focus detection areas set by the focus detection area setting section 131, an exposure AF method changing section 128 changes the exposure settings and the AF method.

Figure 3A:
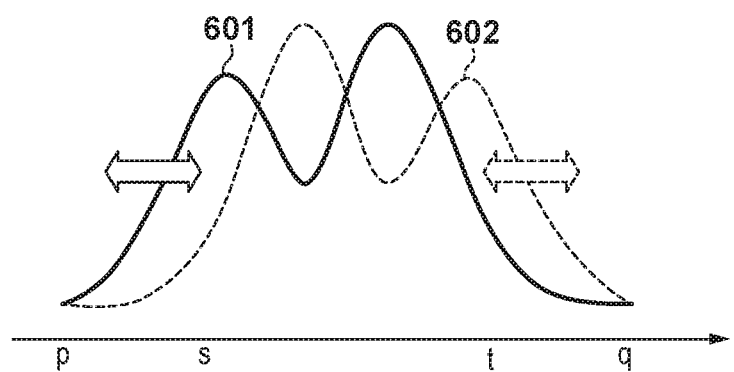
FIGS. 3A to 3C are diagrams for explaining calculation processing of an image shift amount according to the embodiment.

Here, details of the calculation process of the image shift amount performed in the correlation calculation section 127 will be described with reference to FIGS. 3A to 3C. The letters p, q, s, t in FIG. 3A represent the coordinates in the horizontal direction (x axis direction), where p and q are the start point and the end point of a pixel region, respectively, and s and t are the start point and the end point of the focus detection area, respectively. A solid line 601 represents one of focus detection signals which have undergone filter processing (for example, A signal), and a broken line 602 represents the other focus detection signal (for example, B signal).

When calculating a correlation amount of the pair of focus detection signals 601 and 602, both the focus detection signals 601 and 602 are shifted by arbitrary constant bits in the direction of the arrow, and the sum of the absolute values of differences between the focus detection signals 601 and 602 is calculated each time the focus detection signals 601 and 602 are shifted. Hereinafter, for simplicity of explanation, it is assumed the bit width of each shift is 1. In this case, the maximum shift amount in the minus direction is p−s, and the maximum shift amount in the plus direction is q−t. Further, given the start coordinate and the end coordinate of the target partial region for calculating a correlation amount COR are x and y, respectively, and the shift amount is i, the correlation amount COR can be calculated by the following expression (1).

$$COR[i]=\Sigma k=x^y|A[k+i]-B[k-i]|\{(p-s)<i<(q-t)\} \qquad (1)$$

Figure 3B:
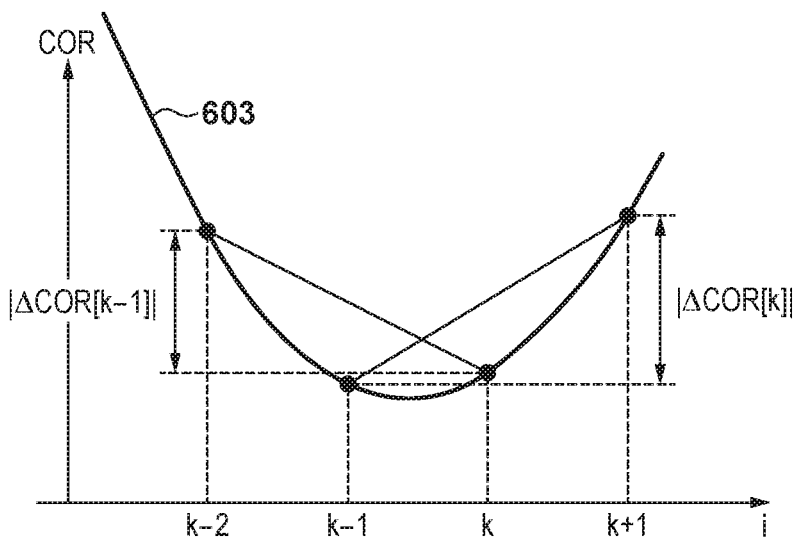

FIG. 3B is an example showing the relationship between the shift amount i and the correlation amount COR. The horizontal axis represents the shift amount i and the vertical axis represents the correlation amount COR. The differences between the correlation amounts obtained at every other shift near the extreme value of the waveform 603 of the correlation amount COR is calculated as the correlation change amount ΔCOR. As described above, if the shift amount is i, the maximum shift amount in the minus direction is p−s, and the maximum shift amount in the plus direction is q−t, then the correlation change amount ΔCOR can be calculated using the following expression (2). At this time, the relationship of p−s+1<q−t−1 holds.

$$\Delta COR[i]=\Delta COR[i-1]-\Delta COR[i+1],(p-s)<i<(q-t) \qquad (2)$$

Figure 3C:
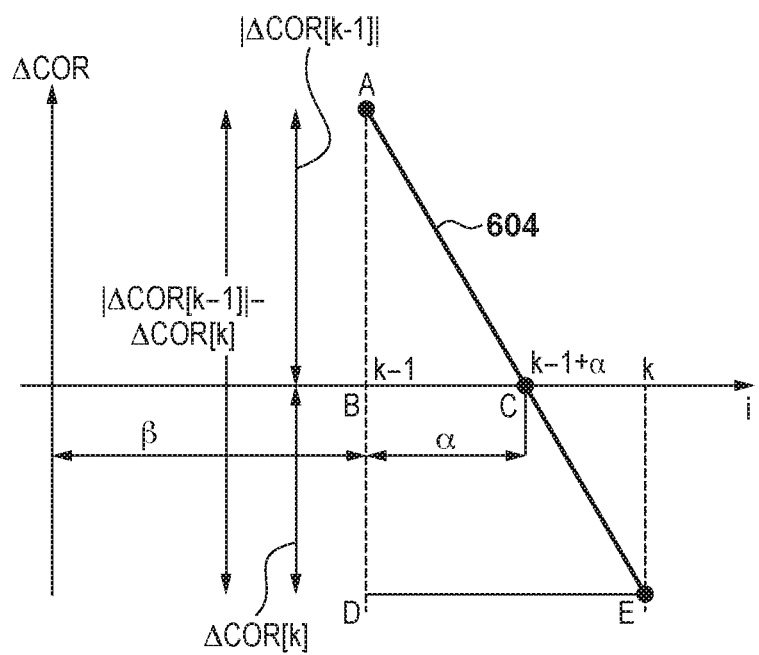

FIG. 3C shows an example of the relationship between the shift amount i and the correlation change amount ΔCOR. The horizontal axis represents the shift amount i and the vertical axis represents the correlation change amount ΔCOR. The waveform 604 of the correlation change amount ΔCOR which changes with respect to the shift amount i changes from plus to minus. A state in which the correlation change amount is 0 is called a zero cross, where the degree of coincidence of the pair of focus detection signals 601 and 602 is the highest. Therefore, the shift amount corresponding to the zero cross is the image shift amount.

The shift amount (k−1+α) corresponding to the zero cross can be divided into an integer part β (=k−1) and a fractional part α. The fractional part α can be calculated using the following expression (3) based on the similarity relationship between a triangle ABC and a triangle ADE in FIG. 3C.

$$AB{:}AD = BC{:}DE \qquad (3)$$
$$\Delta COR\{k-1\}{:}\Delta COR[k-1] - COR[k] = \alpha{:}k-(k-1)$$
$$\alpha = \frac{\Delta COR[k-1]}{\Delta COR[k-1] - \Delta COR[l]}$$

The fractional part β can be calculated using the following expression (4).

$$\beta=k-1 \qquad (4)$$

The image shift amount can be calculated by adding α and β.

Next, referring to a flowchart shown in FIG. 4, focus adjustment processing according to the first embodiment in the moon shooting mode in which the moon is taken as a main subject will be described.

First, in step S101, an initialization process of performing overall initialization such as initialization of variables used in the image capturing apparatus is performed. Next, in step S102, it is determined whether the user has selected the moon shooting mode as a shooting mode using the operation unit 116. If the moon shooting mode is not selected, this process is terminated. If the moon shooting mode is selected, the process proceeds to step S103, where a command is issued from the zoom control section 134 to the zoom lens driving unit 123 to drive the zoom lens 102 to a position at which a predetermined focal length is obtained. Next, an AF frame display process is performed in step S104.

Here, details of the AF frame display process performed in step S104 will be described with reference to the flowchart of FIG. 5. In step S201, the current date set in the image capturing apparatus is acquired. Next, in step S202, it is determined whether or not the date acquired in step S201 is within a predetermined number of days before or after the new moon (around moon phase 0). Since the date of the new moon is known beforehand, the information of the new moon may be stored in the storage memory 115 at the time of manufacturing the image capturing apparatus, or may be obtained from outside through a removable storage medium or a communication, for example. The present invention is not limited to the method of acquiring the information. As for the predetermined number of days, when the moon is on the focus detection area in the center of the screen, since it is possible to perform focus detection in the focus detection area at the center of the screen, the number of days that the moon does not fall on the focus detection area in the center of the screen can be considered, however, it may be set appropriately. If the date is close to the new moon, the process proceeds to step S203.

Figure 8A:
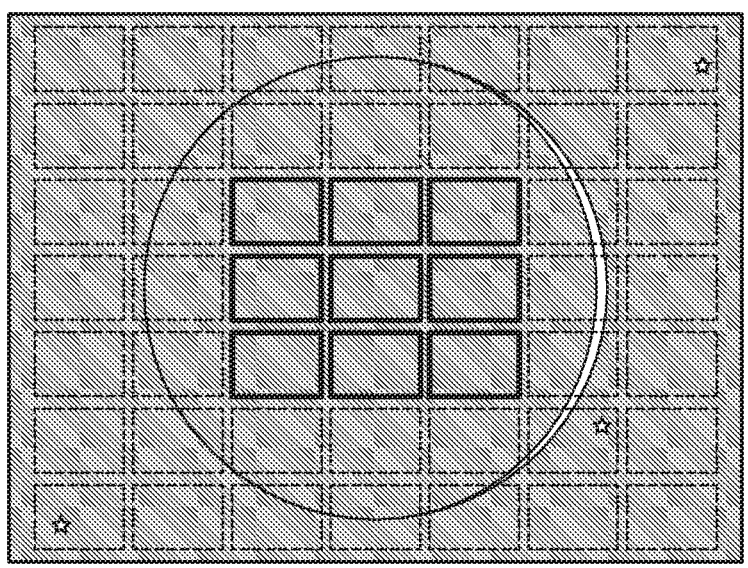
FIGS. 8A to 8C are views for explaining an example of setting of focus detection areas according to the first embodiment.
Figure 8B:
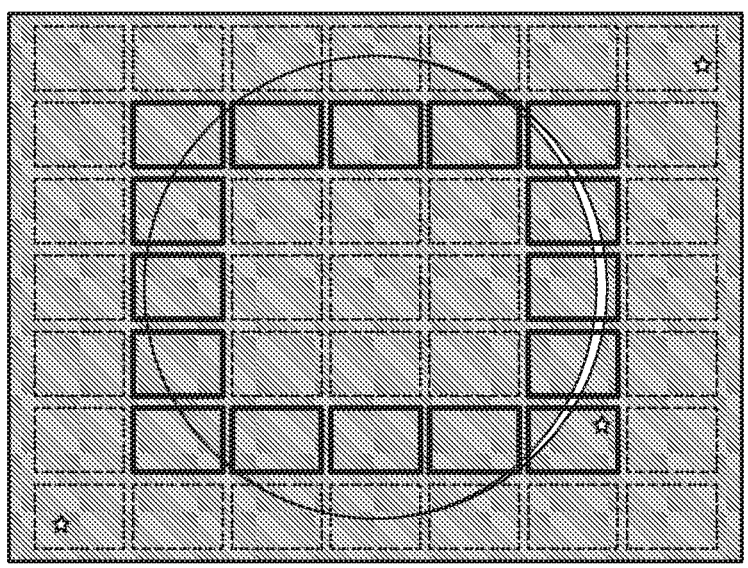
Figure 8C:
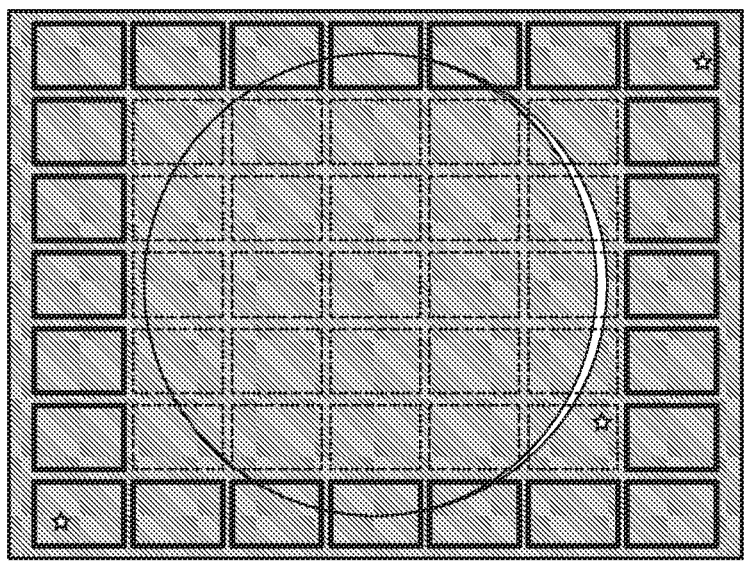

In step S203, the focus detection area is selected for a thin month before and after the new moon, and the shape of the AF frame is changed so as to indicate the selected focus detection area. This process is described with reference to FIGS. 8A to 8C. In the first embodiment, as shown in FIGS. 8A to 8C, it is assumed that the focus detection area can be set at a total of 49 positions combining 7 coordinates in the vertical direction and 7 coordinates in the horizontal direction on the entire screen. In the example shown in FIG. 8A, although the moon is captured in the center of the screen, since it is a crescent moon, if nine focus detection areas in the center of the screen are selected and the phase difference AF is executed for the selected focus detection areas, the in-focus position for the moon cannot be detected. In this case, as shown in FIG. 8B, by using 16 focus detection areas in the vicinity of the center of the screen, the in-focus position for the crescent moon can be detected in a part of the focus detection area on the right side of the vicinity of the center of the screen. Therefore, in step S203, the AF frame is displayed in the area shown in FIG. 8B.

It should be noted that the shape of the AF frame may be such that each focus detection area is shown independently, or a plurality of the selected focus detection areas are shown collectively. Further, as shown in FIG. 10A, the shape of the AF frame may be deformed so as to conform to the shape of a thin moon.

Next, in step S204, the color of the AF frame is set to a color (for example, a lighter color) different from the color of the AF frame in the case where the acquired date is not within the predetermined number of days before and after the new moon.

On the other hand, if it is determined in step S202 that the date acquired in step S201 is not within the predetermined number of days before and after the new month (moon phase 0), the process proceeds to step S205. In step S205, as shown in FIG. 10B, the focus detection areas at the center of the screen are selected for a fat moon, excluding a moon around the new moon, and the shape of the AF frame is changed so as to indicate the selected focus detection areas. It should be noted that the shape of the AF frame may be such that each focus detection area is shown independently, or a plurality of the selected focus detection areas are shown collectively.

Next, in step S206, the color of the AF frame is set to a color (for example, a more vivid color) different from the color in the case of a thin moon.

Figure 4:
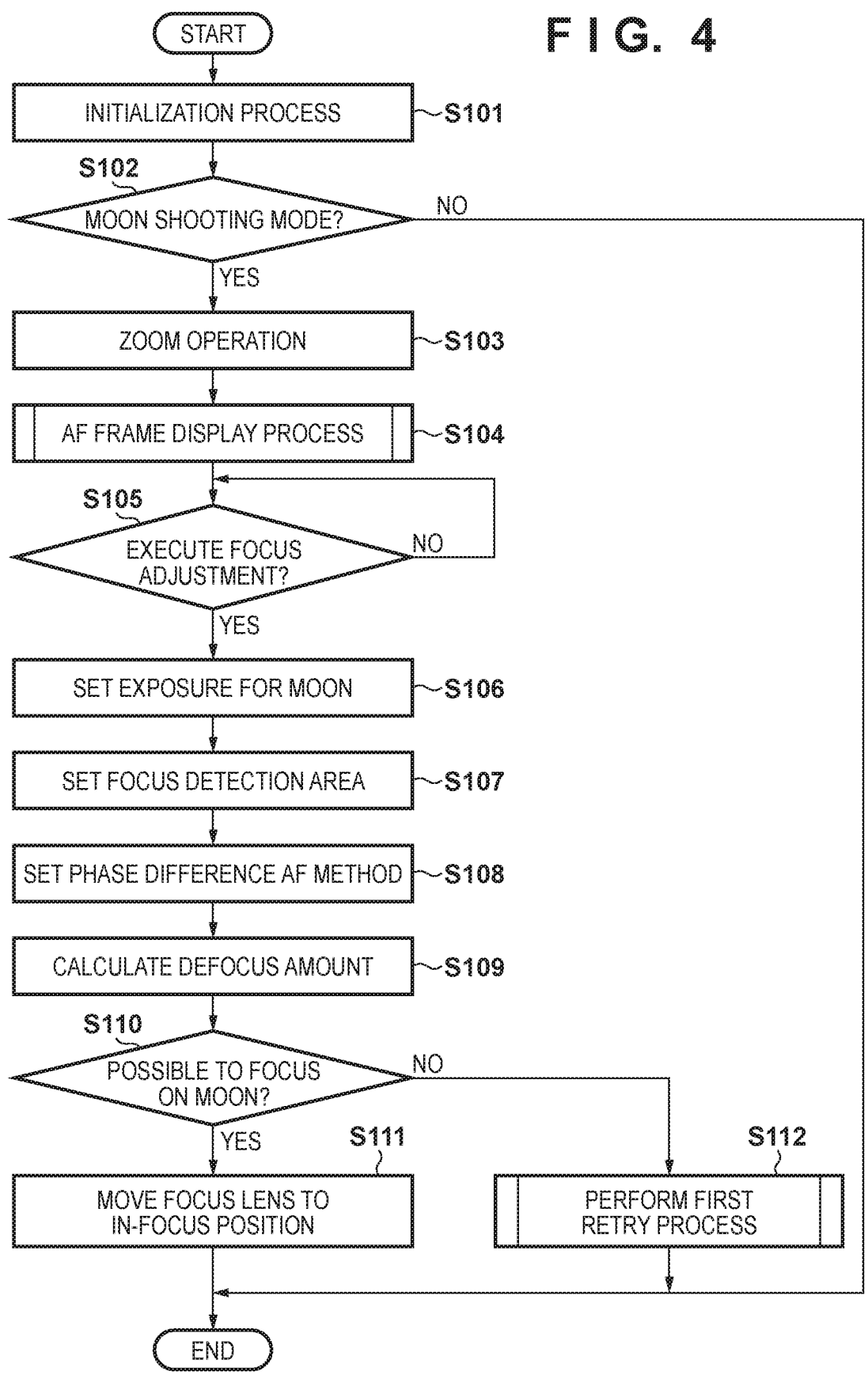
FIG. 4 is a flowchart showing focus adjustment processing in the moon shooting mode according to the first embodiment.

In step S207, the AF frame of the set shape and color is displayed, and the process returns to the process of FIG. 4.

Figure 5:
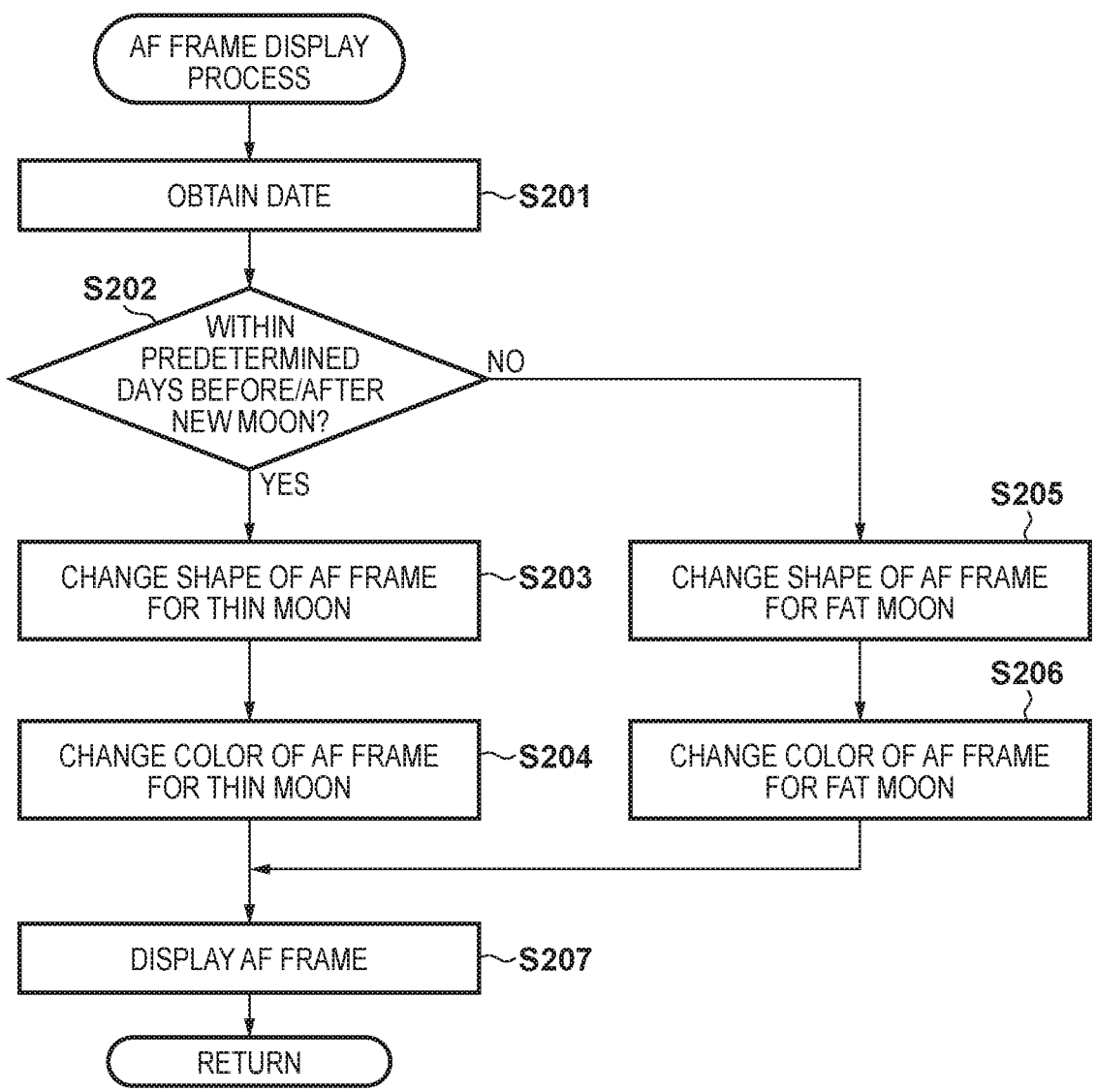
FIG. 5 is a flowchart showing AF frame display processing according to the first embodiment.

Since the AF frame display process shown in FIG. 5 is performed based on the date acquired from the image capturing apparatus, if the date set in the image capturing apparatus is different from the actual date, there may be a case where an appropriate AF frame is not displayed.

In step S105, it is determined whether or not the user instructs execution of focus adjustment in the moon shooting mode by performing a predetermined operation on the operation unit 116. As described above, in general, the image capturing apparatus individually performs focus adjustment on a subject located at an infinite distance, and the in-focus position may deviate due to change in temperature, posture, and the lapse of time. Therefore, even when shooting the moon whose distance from the image capturing apparatus does not substantially change, the user sometimes wants to perform focus adjustment on the moon. In the case where execution of focus adjustment is not instructed, such as in the case where the focus state of the moon is adequate in the present state, for example, monitoring for an instruction for focus adjustment is continued until focus adjustment is executed, and when an instruction for executing the focus adjustment is issued, the process proceeds to step S106.

In step S106, the exposure is set for shooting the moon. The exposure set here is specialized for focusing in the moon shooting mode, and the exposure suitable for calculating a defocus amount and different from the exposure at the time of normal shooting is set. Therefore, even in the case where brightness of a subject does not cause high-light detail loss (pixel saturation) in normal photography, high-light detail loss (pixel saturation) may occur during focus adjustment processing in the moon shooting mode.

In step S107, focus detection areas are set. The AF frame set in step S105 is a frame visible to the photographer while the focus detection areas are areas for internal processing for calculating the defocus amount.

Figure 9A:
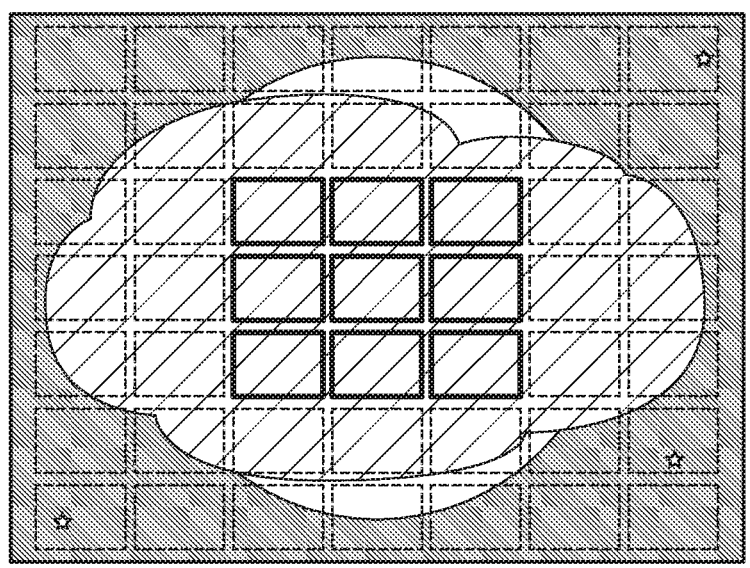
FIGS. 9A to 9C are views for explaining an example of setting of focus detection areas according to the first embodiment.

In step S108, the AF method is set to the phase difference AF method, and in step S109, the defocus amount is calculated as described above with reference to FIGS. 3A to 3C. At this time, reliability is calculated together with the defocus amount. The reliability may be obtained by a known method, and it becomes low in a case where the contrast is low or in a case where a plurality of extreme values of the correlation amount exist, for example. For example, in a case where the focus detection areas are set as shown in FIG. 8A because the set date is incorrect, or in a case where the full moon is detected but the focus detection areas are covered with the cloud as shown in FIG. 9A and the contrast is low, the defocus amount cannot be obtained or the reliability is low.

Next, in step S110, it is determined based on the defocus amount and reliability calculated in step S109 whether or not it is possible to focus on the moon with the obtained defocus amount. For example, in a case where the position of the focus lens 104 that is driven in accordance with the obtained defocus amount corresponds to a distance shorter than a predetermined subject distance, or in a case where the reliability is lower than a predetermined reliability, it is determined that it is not possible to focus on the moon. Note that determination by the reliability is not necessarily required, and determination may be made based only on the defocus amount.

If it is possible to focus on the moon, the process advances to step S111 to drive the focus lens 104 to the in-focus position. If it is not possible to focus on the moon, the process proceeds to step S112 and a first retry process is performed.

Figure 9B:
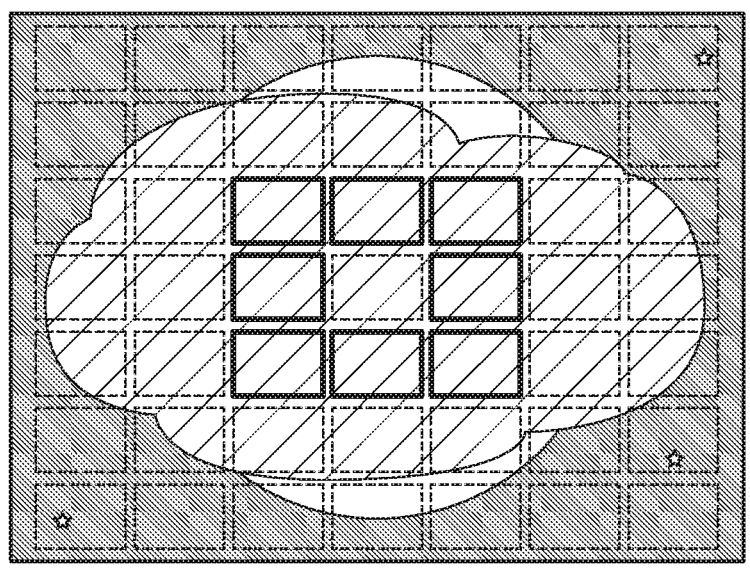

Here, the first retry process performed in step S112 will be described with reference to a flowchart of FIG. 6. Note that, with the start of the first retry process, the AF frame displayed in step S104 may be hidden, and by hiding it, it is possible to notify the user that focus detection could not be performed in the AF frame displayed in step S104. First, in step S301, a luminance value of an area 1 (photometry region) located at the center of the screen in FIG. 10C is acquired. In step S302, whether or not the luminance value acquired in step S301 is equal to or larger than a predetermined threshold value is determined. When the luminance value is equal to or larger than the threshold value, there is a possibility that a fat moon exists. This determination results in affirmative in a case where, for example, as shown in FIG. 9A, the moon is captured in the center of the screen but the center of the moon is covered with the cloud, and thus the luminance value shows a certain degree of brightness because it is a full moon but focus detection could not be done. In this case, the process proceeds to step S303 and areas 2 around the area 1 shown in FIG. 10C are reselected. As a result, the selected focus detection areas are as shown in FIG. 9B.

On the other hand, when the luminance value is less than the threshold value, there is a possibility that a thin moon exists. In this case, the process proceeds to step S304, and areas 3 shown in FIG. 10C is reselected. As a result, the selected focus detection areas are as shown in FIG. 8B.

In step S305, as in step S109, a defocus amount and reliability are calculated in the phase difference AF method for the focus detection areas reselected in step S303 or S304.

In step S306, based on the defocus amount and reliability calculated in step S305, it is determined whether or not it is possible to focus on the moon using the obtained defocus amount in the same manner as in step S110. If it is possible to focus on the moon, the process proceeds to step S307 and the in-focus notification is performed. The in-focus notification is a signal for informing the photographer of the in-focus state, and includes changing the color of the AF frame in the vicinity of the center of the screen, and ringing the in-focus sound, for example. In step S308, the focus lens 104 is driven to the in-focus position.

Figure 9C:
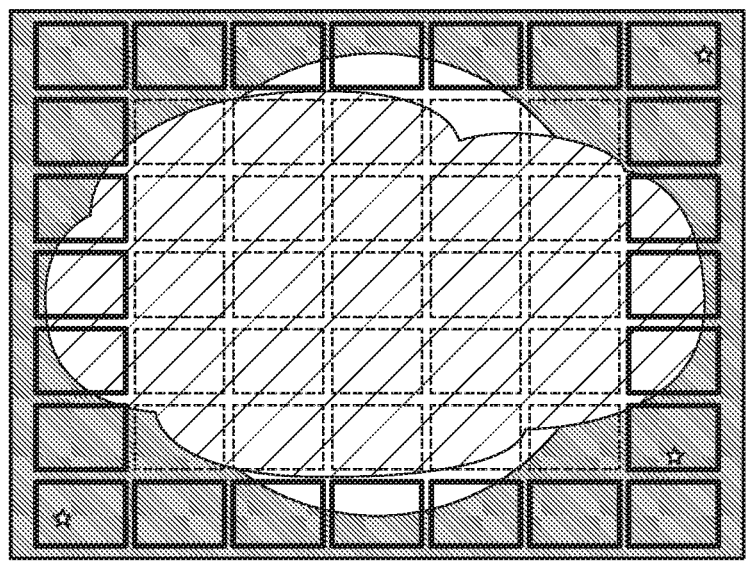

On the other hand, if it is not possible to focus on the moon, the target of focus is switched from the moon to the stars around the moon. Since the moon and a star have different brightness, in step S309, the exposure setting for the moon is changed to the exposure setting for stars. Then, in step S310, the focus detection areas are changed to areas 4 shown in FIG. 10C in order to change the target of focus from the moon to the stars around the moon. As a result, the selected focus detection areas are as shown in FIG. 8C and FIG. 9C. In the next step S311, in response to the switching of the areas to be used as the focus detection areas from the center of the screen to the periphery of the screen, the AF method is switched from the phase difference AF method to the contrast AF method that is advantageous in accuracy. The reason why the AF method is changed as described above is that the correct image shift amount tends not to be calculated in the phase difference AF due to the optical factor (coma aberration, shading) in the focus detection areas arranged close to the periphery of the screen.

In step S312, the defocus amount and reliability of the areas 4 are calculated by the contrast AF method. Specifically, evaluation values which are the calculation results of the evaluation value calculation section 126 at predetermined focus lens positions controlled by the scan control section 129 are acquired, and the contrast AF defocus amount calculation section 132 calculates a defocus amount from the focus lens position at which the evaluation values maximizes. Further, reliability can be calculated from the shape of a graph of the evaluation values with respect to the focus lens positions.

In step S313, based on the defocus amount and reliability calculated in step S312, it is determined whether or not it is possible to focus on the stars using the obtained defocus amount, in the similar manner as in step S110. If it is possible to focus on the stars, the process proceeds to step S314, and the in-focus notification is performed. Since the target of subjects is the moon, and even if the moon cannot be detected with some reasons, the stars located at the same infinite distances as the moon from the ground can be detected, when the in-focus notification is performed, the AF frame is displayed near the center of the screen in order to inform that the moon will be also in focus. Then, in step S315, the focus lens 104 is driven to the in-focus position based on the defocus amount.

If it is not possible to focus on the stars, the process proceeds to step S316, and the focus lens 104 is driven to an adjusted position where a subject at an infinite distance will be in focus. Upon completion of the above processing, the focus adjustment processing in the moon shooting mode according to the first embodiment is ended.

According to the first embodiment as described above, in the mode of shooting a celestial body, it is possible to perform focus adjustment with high accuracy on a main subject that cannot be focused in the phase difference AF, by using subjects existing in the vicinity of the main subject.

Modification

Figure 7:
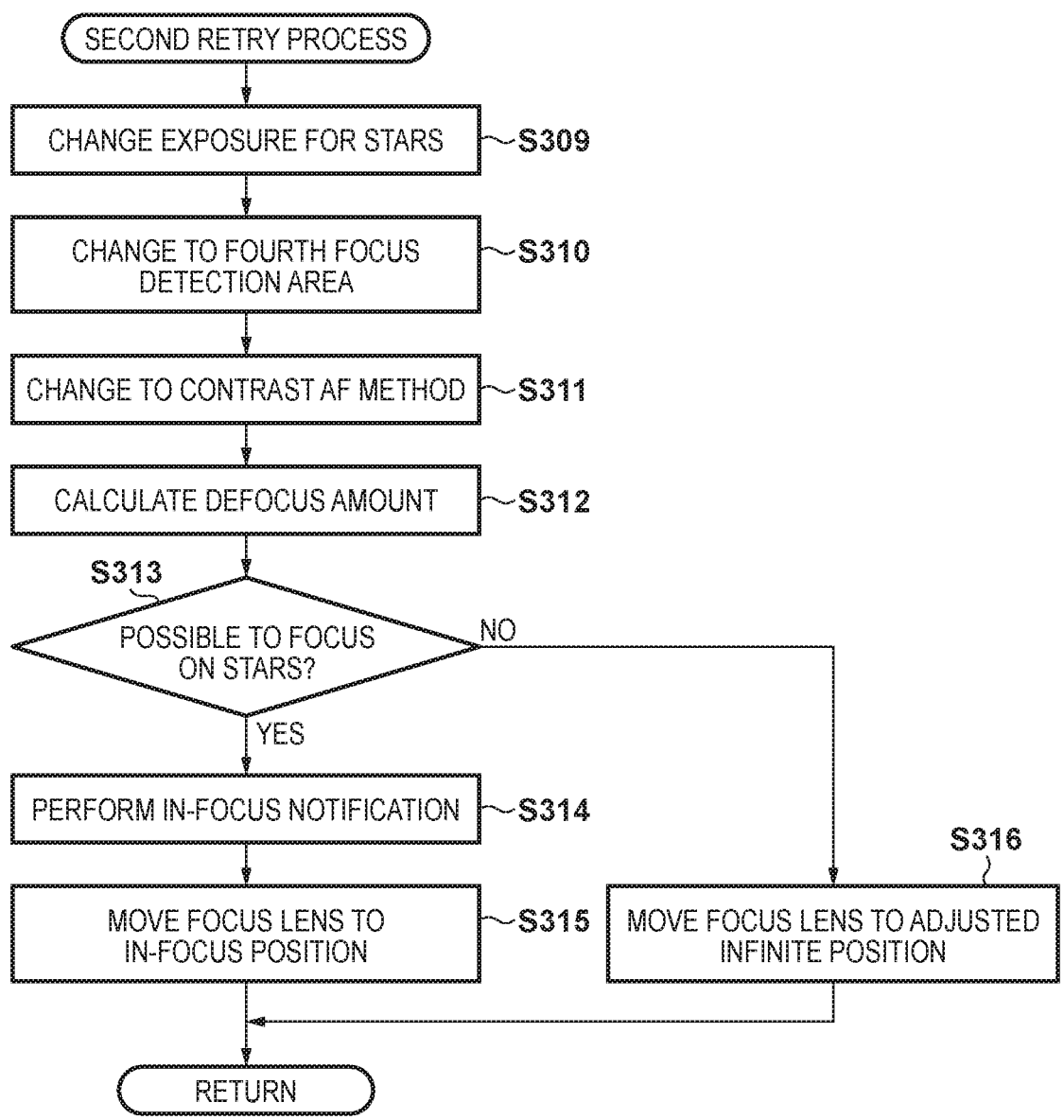
FIG. 7 is a flowchart showing a second retry process according to a modification.

Instead of the first retry process in the above-described first embodiment, a second retry process may be performed. FIG. 7 is a flowchart showing the second retry process in this modification. The second retry process is performed in place of the first retry process performed in step S112 of FIG. 4, and the other processes are the same as those in the first embodiment described above, so those description is omitted.

Figure 6:
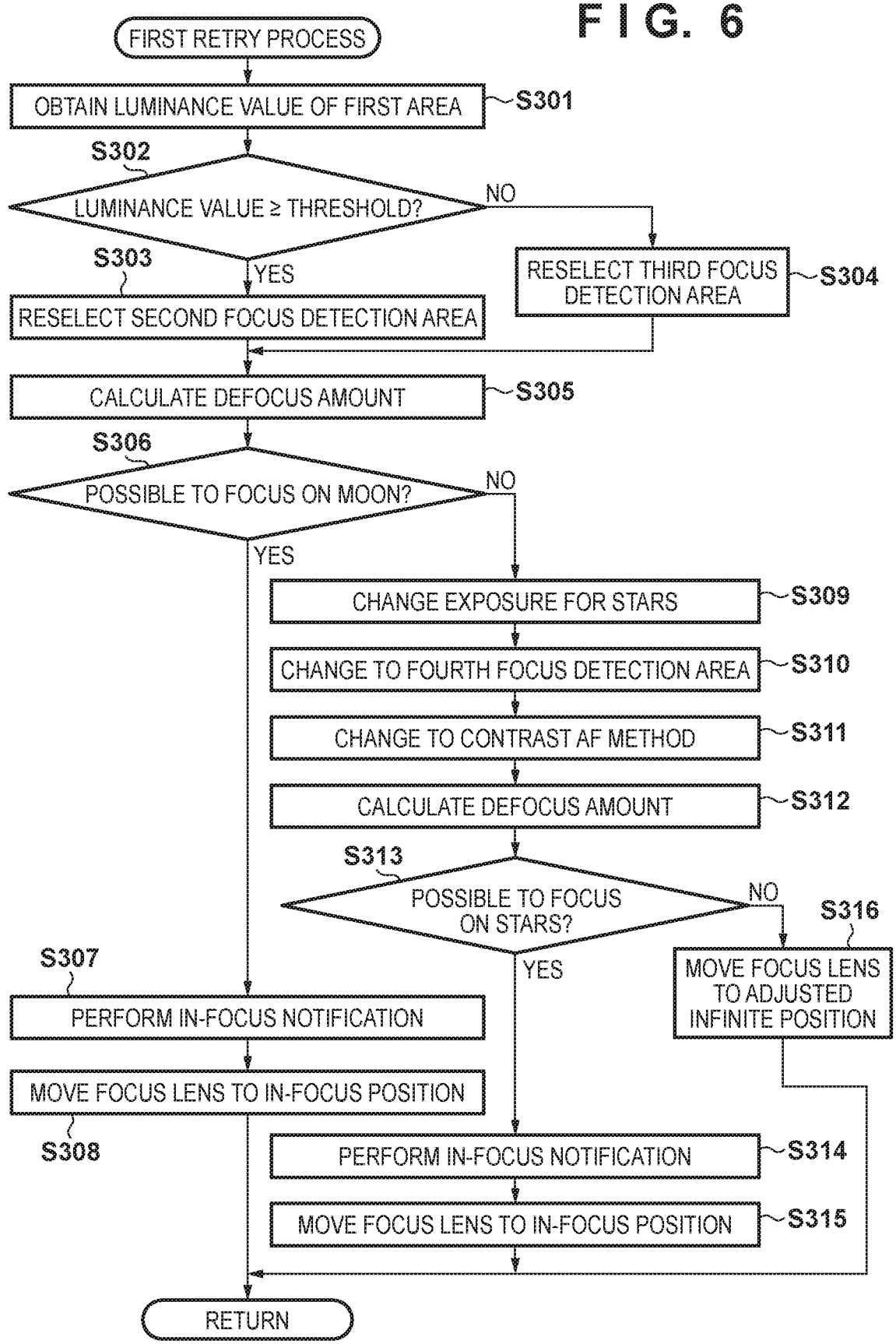
FIG. 6 is a flowchart showing a first retry process according to the first embodiment.

The difference between the second retry process shown in FIG. 7 and the first retry process shown in FIG. 6 is that, in the second retry process, only the processes of steps S309 to S316 of the first retry process are performed. Therefore, in FIG. 7, the same reference numerals are assigned to the same processes as those in FIG. 6, and description thereof will be omitted.

As described above, in a case where it is determined that it is not possible to focus on the moon in S110 based on the defocus amount and reliability obtained in the focus detection area corresponding to the AF frame selected in step S104 of FIG. 4, the subject is immediately changed from the moon to stars, and focus detection is performed on the stars. In this way, although there is a possibility that accuracy of focus adjustment may deteriorate compared with the process shown in FIG. 6, it is possible to perform focus adjustment faster.

Although a digital camera has been described as an example of an image capturing apparatus, the present invention is not limited to a digital camera, and the present invention can be applied to various devices having an image capturing apparatus.

In the above description, the second retry process has been described as being executed instead of the first retry process, but it may be configured such that the first retry process or the second retry process is selectively executed in accordance with a user instruction, predetermined conditions, and so forth.

Second Embodiment

Figure 11A:
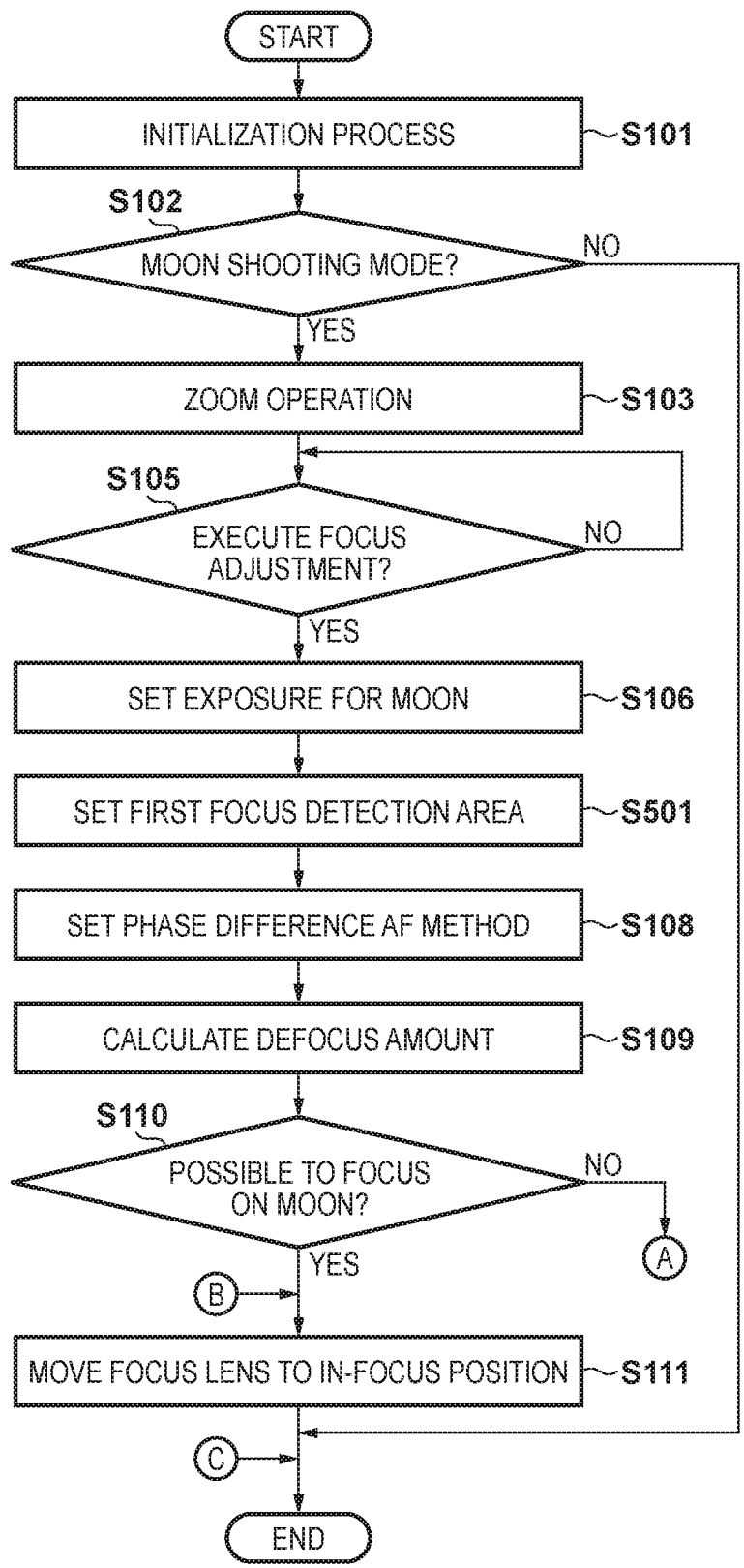

Next, a second embodiment of the present invention will be described. It should be noted that in the second embodiment, an explanation will be given of a digital camera having the configuration described with reference to FIG. 1 and FIGS. 2A and 2B. FIGS. 11A and 11B are flowcharts showing focus adjustment processing in the moon shooting mode according to the second embodiment, and FIGS. 12A to 12F are diagrams for explaining examples of set focus detection areas in the second embodiment. In FIGS. 11A and 11B, the same reference numerals are given to the same processes as those shown in FIG. 4, and the description thereof will be omitted as appropriate.

When driving of the zoom lens is finished in step S103, it is determined in step S105 whether or not the user has instructed execution of focus adjustment in the moon shooting mode by performing a predetermined operation on the operation unit 116. When execution of the focus adjustment is instructed, the process proceeds to step S106. In step S106, exposure setting suitable for shooting the moon is performed, and the process proceeds to step S501.

Figure 12A:
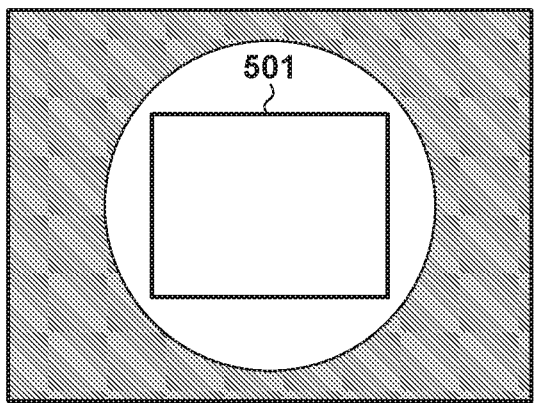
FIGS. 12A to 12F are views for explaining an example of setting of focus detection areas according to the second embodiment.
Figure 12B:
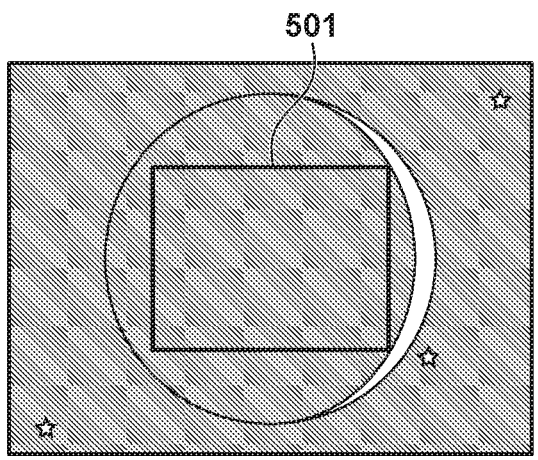
Figure 12C:
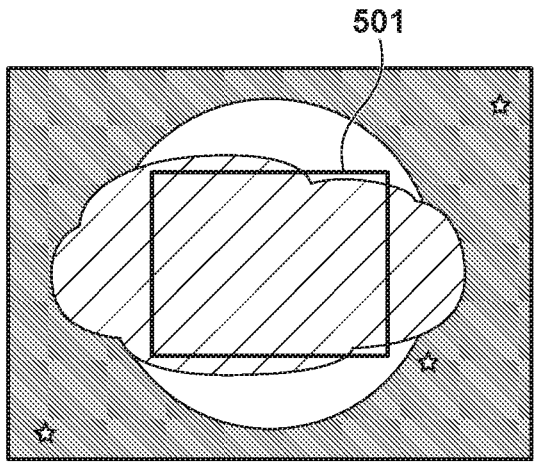

In step S501, a predetermined focus detection area 1 is set in the center of the screen and an AF frame 501 is displayed at the position of the selected focus detection area 1. FIGS. 12A to 12C are diagrams showing displayed examples of the AF frame 501.

In step S108, the AF method is set to the phase difference AF method, and in step S109, the defocus amount and reliability are calculated as described above with reference to FIGS. 3A to 3C. Next, in step S110, it is determined based on the defocus amount and reliability calculated in S110 whether or not it is possible to focus on the moon with the obtained defocus amount. For example, in the case as shown in FIG. 12A, it is considered that it is possible to focus on the moon. If it is possible to focus on the moon, the process advances to step S111 to move the focus lens 104 to the in-focus position, and the process is terminated.

Figure 12D:
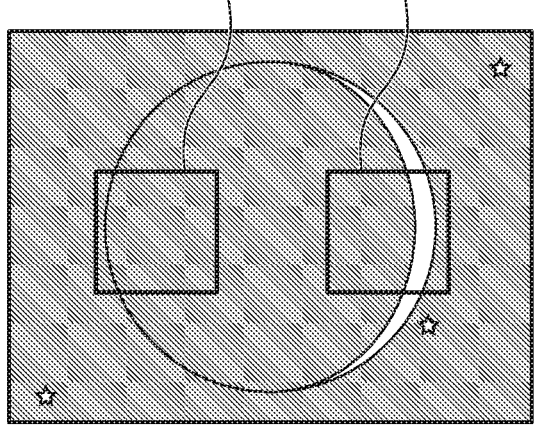
Figure 12E:
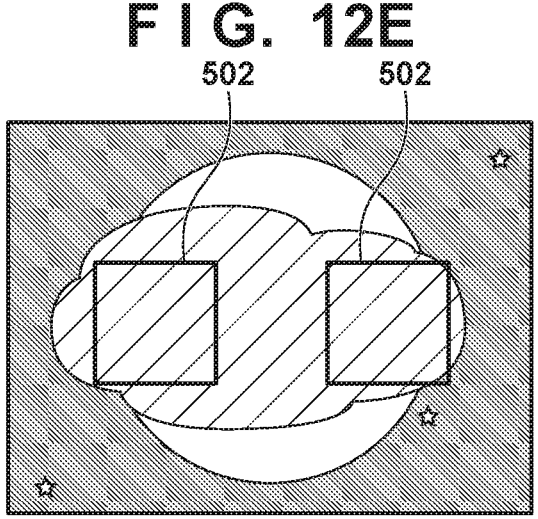

On the other hand, for example, in the case as shown in FIG. 12B or FIG. 12C, it is considered that it is not possible to focus on the moon. If it is not possible to focus on the moon, the process proceeds to step S502, where predetermined focus detection areas 2 on the left and right from the center of the screen are set as shown in FIG. 12D or FIG. 12E, and AF frames 502 are displayed at the positions of the selected focus detection areas 2. In the next step S503, the AF method is switched to the contrast AF method which is advantageous in detection accuracy. The reason why the AF method is changed in this way is that the correct image shift amount tends not to be calculated in the phase difference AF due to the optical factor (coma aberration, shading) in the focus detection areas arranged at the periphery of the screen.

In step S504, the defocus amount and reliability of the focus detection areas 2 set in step S502 are calculated by the contrast AF method. In step S505, it is determined based on the defocus amount and reliability calculated in step S504 whether or not it is possible to focus on the moon with the obtained defocus amount. For example, in the case as shown in FIG. 12D, it is considered that it is possible to focus on the moon. If it is possible to focus on the moon, the process advances to step S111 to drive the focus lens 104 to the in-focus position, and the process is terminated.

Figure 12F:
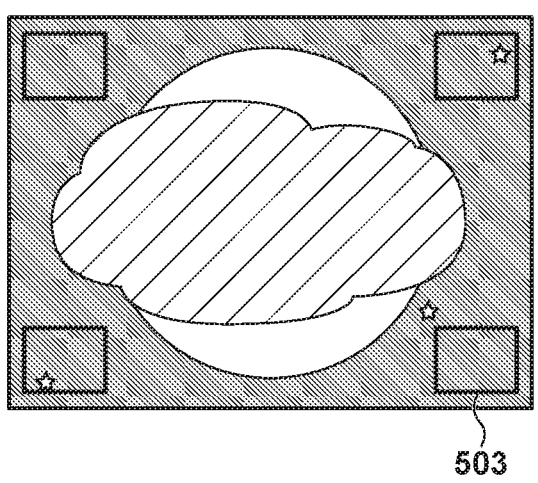
Figure 13A:
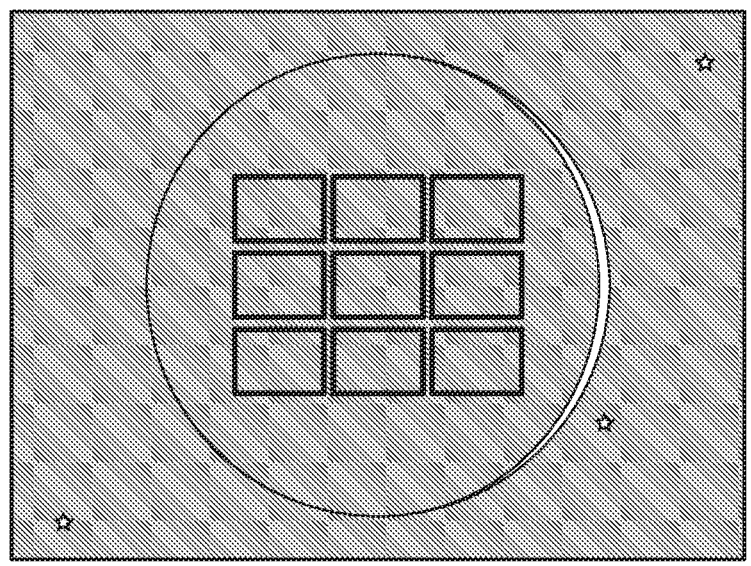
FIGS. 13A and 13B are views for explaining examples in which focus adjustment cannot be performed in the moon shooting mode.
Figure 13B:
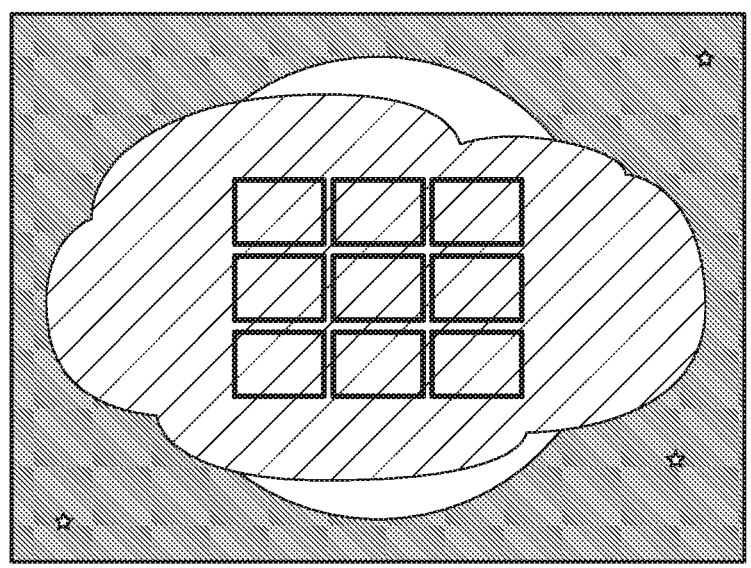

On the other hand, in the case as shown in FIG. 12E, for example, it is considered that it is not possible to focus on the moon. If it is not possible to focus on the moon, the target of focus is switched from the moon to the stars existing around the moon. In step S506, as shown in FIG. 12F, predetermined focus detection areas 3 are set in the periphery of the screen, and AF frames 503 are displayed at the positions of the selected focus detection areas 3. In next step S507, the exposure setting for the moon is changed to the exposure setting for stars.

In step S508, the defocus amount and reliability of the focus detection areas 3 set in step S506 are calculated by the contrast AF method. In step S509, it is determined based on the defocus amount and reliability calculated in step S508 whether or not it is possible to focus on the stars with the obtained defocus amount.

If it is possible to focus on the stars, the process proceeds to step S510 to perform in-focus notification. Since the target of subjects is the moon, and even if the moon cannot be detected with some reasons, the stars located at the same infinite distances as the moon from the ground can be detected, when the in-focus notification is performed, the AF frame is displayed near the center of the screen in order to inform that the moon will be also in focus. Then, in step S111, the focus lens 104 is driven to the in-focus position based on the defocus amount.

If it is not possible to focus on the stars, the process proceeds to step S511, and the focus lens 104 is driven to an adjusted position where a subject at an infinite distance will be in focus. Upon completion of the above processing, the focus adjustment processing in the moon shooting mode according to the second embodiment is ended.

According to the second embodiment as described above, in the mode of shooting a celestial body, it is possible to perform focus adjustment with high accuracy on a main subject that cannot be focused in the phase difference AF, by using subjects existing in the vicinity of the main subject.

In the above-described second embodiment, three types of focus detection areas, namely, the focus detection area 1 to the focus detection areas 3, are set as the predetermined focus detection areas, however, the present invention is not limited to this, and two types, or four or more types of focus detection areas may be set as the predetermined focus detection areas. Further, it is explained that the contrast AF method is used when the focus detection areas 2 are set, however, the defocus amount may be calculated by the phase difference AF method. In other words, the correspondence between the focus detection areas and the AF methods may be appropriately changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-224852, filed on Nov. 22, 2017 which is hereby incorporated by reference herein in its entirety.

What is claimed is:

1. A focus detection apparatus comprising one or more processors and/or circuitry which functions as:
   a setting unit that selects and sets one of a plurality of predetermined focus detection areas which include a first focus detection area and a second focus detection area located in a periphery of a screen in an image shooting mode for shooting a predetermined main subject;
   a first calculation unit that calculates an in-focus position in the focus detection area set by the setting unit based on a phase difference between a pair of focus detection signals having a parallax obtained by performing photoelectric conversion on light entering through an imaging optical system by an image sensor having a plurality of pixels that include focus detection pixels which output the pair of focus detection signals; and
   a second calculation unit that calculates an in-focus position in the focus detection area set by the setting unit based on contrast of image signals output from the image sensor,
   wherein, in a case where the first focus detection area is set by the setting unit, the in-focus position is calculated by the first calculation unit, and in a case where the second focus detection area is set by the setting unit, the in-focus position is calculated by the second calculation unit;
   wherein the one or more processors and/or circuitry further functions as a photometry unit, wherein
   in a case where the in-focus position in the first focus detection area is not obtained by the first calculation unit, the photometry unit performs photometry on a predetermined photometry region, and
   if a luminance value of the photometry region is equal to or larger than a threshold value, the setting unit sets an area around the photometry region as a third focus detection area,
   if the luminance value of the photometry region is less than the threshold value, the setting units sets an area which is closer to a periphery of the screen than the third focus detection area as a fourth focus detection area, the first calculation unit calculates an in-focus position in the third or the fourth focus detection area, and if the in-focus position is not obtained, then the setting unit sets the second focus detection area.

2. A focus detection apparatus comprising one or more processors and/or circuitry which functions as:
   a setting unit that selects and sets one of a plurality of predetermined focus detection areas which include a first focus detection area and a second focus detection area located in a periphery of a screen in an image shooting mode for shooting a predetermined main subject;
   a first calculation unit that calculates an in-focus position in the focus detection area set by the setting unit based on a phase difference between a pair of focus detection signals having a parallax obtained by performing photoelectric conversion on light entering through an imaging optical system by an image sensor having a plurality of pixels that include focus detection pixels which output the pair of focus detection signals; and
   a second calculation unit that calculates an in-focus position in the focus detection area set by the setting unit based on contrast of image signals output from the image sensor,
   wherein, in a case where the first focus detection area is set by the setting unit, the in-focus position is calculated by the first calculation unit, and in a case where the second focus detection area is set by the setting unit, the in-focus position is calculated by the second calculation unit;
   wherein, in a case where an in-focus position in the first focus detection area is not obtained by the first calculation unit, the setting unit sets an area closer to the periphery of the screen than the first focus detection area as a third focus detection area and an in-focus position in the third focus detection area is calculated by the first calculation unit or the second calculation unit, and if the in-focus position in the third focus detection area is not obtained, the setting unit sets the second focus detection area.

3. The focus detection apparatus according to claim 2, wherein the one or more processors and/or circuitry further functions as a control unit that controls to drive a focus lens to the in-focus position in a case where the in-focus position is obtained by the first calculation unit or the second calculation unit.

4. The focus detection apparatus according to claim 2, wherein the main subject is the moon.

5. The focus detection apparatus according to claim 4, wherein the one or more processors and/or circuitry further functions as an acquisition unit that acquires date,
   the setting unit sets the first focus detection area based on the acquired date.

6. The focus detection apparatus according to claim 5, wherein the setting unit sets an area including a center of the screen as the first focus detection area in a case where the date exceeds a predetermined number of days before or after moon phase 0, and sets an area between the center of the screen and the periphery of the screen as the first focus detection area in a case where the date is within the predetermined number of days before or after moon phase 0.

7. The focus detection apparatus according to claim 2, wherein the one or more processors and/or circuitry further functions as an exposure control unit that performs exposure control such that exposure corresponding to the main object is set in a case where the first focus detection area is set by the setting unit, and exposure corresponding to a subject in a vicinity of the main subject is set in a case where the second focus detection area is set by the setting unit.

8. The focus detection apparatus according to claim 7, wherein the subject in the vicinity of the main subject is a star.

9. The focus detection apparatus according to claim 2, wherein the one or more processors and/or circuitry further functions as a notification unit that notifies that the main subject is in focus in a case where the in-focus position in the second focus detection area is obtained.

10. The focus detection apparatus according to claim 2, wherein the one or more processors and/or circuitry further functions as a zoom control unit that controls a focal length of the imaging optical system to a focal length suitable for shooting the moon in an image shooting mode for shooting the main subject.

11. A focus detection method comprising:
    selecting and setting one of a plurality of predetermined focus detection areas which include a first focus detection area and a second focus detection area located in a periphery of a screen in an image shooting mode for shooting a predetermined main subject;
    calculating, in a case where the first focus detection area is set, an in-focus position in the first focus detection area based on a phase difference between a pair of focus detection signals having a parallax obtained by performing photoelectric conversion on light entering through an imaging optical system by an image sensor having a plurality of pixels that include focus detection pixels which output the pair of focus detection signals;

calculating, in a case where the second focus detection area is set, an in-focus position in the second focus detection area based on contrast of image signals output from the image sensor; and setting, in a case where the first focus detection area is set and an in-focus position in the first focus detection area is not obtained, an area closer to the periphery of the screen than the first focus detection area as a third focus detection area, and calculating an in-focus position in the third focus detection area based on a phase difference between the pair of focus detection signals or based on contrast of the image signals output from the image sensor, wherein, if the in-focus position in the third focus detection area is not obtained, the second focus detection area is set.

12. A non-transitory storage medium readable by a computer, the storage medium storing a program that is executable by the computer, wherein the program includes program code for causing the computer to function as a focus detection apparatus comprising:

a setting unit that selects and sets one of a plurality of predetermined focus detection areas which include a first focus detection area and a second focus detection area located in a periphery of a screen in an image shooting mode for shooting a predetermined main subject;

a first calculation unit that calculates an in-focus position in the focus detection area set by the setting unit based on a phase difference between a pair of focus detection signals having a parallax obtained by performing photoelectric conversion on light entering through an imaging optical system by an image sensor having a plurality of pixels that include focus detection pixels which output the pair of focus detection signals; and a second calculation unit that calculates an in-focus position in the focus detection area set by the setting unit based on contrast of image signals output from the image sensor, wherein, in a case where the first focus detection area is set by the setting unit, the in-focus position is calculated by the first calculation unit, and in a case where the second focus detection area is set by the setting unit, the in-focus position is calculated by the second calculation unit;

wherein, in a case where an in-focus position in the first focus detection area is not obtained by the first calculation unit, the setting unit sets an area closer to the periphery of the screen than the first focus detection area as a third focus detection area and an in-focus position in the third focus detection area is calculated by the first calculation unit or the second calculation unit, and if the in-focus position in the third focus detection area is not obtained, the setting unit sets the second focus detection area.

* * * * *